United States Patent [19]

Jorro

[11] Patent Number: 4,945,233
[45] Date of Patent: Jul. 31, 1990

[54] CALIBRATION AND QUALITY CONTROL SYSTEM FOR NEUTRON LOGGING INSTRUMENTS

[75] Inventor: Robert V. J. Jorro, Houston, Tex.

[73] Assignee: Western Atlas International, Inc., Houston, Tex.

[21] Appl. No.: 223,325

[22] Filed: Jul. 25, 1988

[51] Int. Cl.$^5$ .............................................. G01V 5/10
[52] U.S. Cl. ................................ 250/252.1; 250/269; 250/503.1
[58] Field of Search ..................... 250/252.1, 256, 264, 250/270, 266, 269, 262, 503.1, 496.1, 497.1; 73/152

[56] References Cited

U.S. PATENT DOCUMENTS 3,215,837  11/1965  Hall, Jr. ............................ 250/252.1
4,378,498  3/1983  Givens ............................. 250/252.1

FOREIGN PATENT DOCUMENTS 0348965  8/1972  U.S.S.R. ...................... 250/252.1 R

Primary Examiner—Janice A. Howell
Assistant Examiner—Richard Hanig
Attorney, Agent, or Firm—Patrick H. McCollum; Darryl M. Springs

[57] ABSTRACT

A calibration and response quality verification system for neutron logging instruments includes a chamber filled with a neutron moderating and absorbing solution and sufficiently sized to provide an effectively infinite environment with longitudinal homogenity. A neutron tool is disposed within a calibration tube traversing the chamber. A plurality of rod members are selectively inserted into the annular space between the instrument and tube to provide a plurality of selectable and precisely repeatable environments to represent an extensive range of formation porosities.

6 Claims, 3 Drawing Sheets

CALIBRATION AND QUALITY CONTROL SYSTEM FOR NEUTRON LOGGING INSTRUMENTS

BACKGROUND OF THE INVENTION

The present invention relates to a method and an apparatus for calibration of well logging systems; more particularly, it relates to a method and an apparatus for calibration and verification of the porosity response of neutron logging instruments.

Well logging systems have been utilized in hydrocarbon exploration for many years. Such systems provide data, such as porosity, lithology and water saturation, for use by geologists and petroleum engineers in making determinations pertinent to hydrocarbon exploration. One such system is commonly referred to as a neutron log.

The neutron log is primarily used for the estimation of formation porosities. A neutron logging instrument includes a neutron source and a detector capable of detecting neutron radiation and/or gamma radiation resulting from neutron capture. The basic principle of the neutron log is related to the slowing down of neutrons by the nuclei of the substances encoyntered in the formations. The radiation flux density in the vacinity of the detector is influenced by the composite hydrogen index of the media between the source and the detector. If the rock matrix in the formations contains liquid hydrocarbons and/or water, the neutron log provides porosity with acceptable porosity.

As in the case of most well logging systems, the neutron logging instrument requires calibration and verification by relating the measurement to a known standard. One common method for calibration and verification is accomplished by the use of calibration "test pits" which include a plurality of individual boreholes in a plurality of formation materials of known porosities into which the neutron logging instrument is disposed. While test pits provide accuracy for calibration and verification they have several disadvantages, including high expense of installation and a fixed location. In addition, the requirements of the test pits does not allow installation at each well site. Typical portable calibrators have suffered from numerous short comings, including a lack of sufficient accuracy; a limited number of porosity measurements, typically only one for each calibrator; and adverse affect by environmental factors.

These and other disadvantages are overcome with the present invention by providing a method and an apparatus for calibration and verification of the response of neutron logging instruments by producing selectable and precisely repeatable environments that represent an extensive range of formation porosities.

SUMMARY OF THE INVENTION

In accordance with the present invention, a calibration and verification system includes a cylindrical fluid chamber filled with an aqueous solution that functions as a neutron moderator and absorber. The chamber is of sufficient mass and size to provide an effectively infinite environment with longitudinal homogenity. A tube member having a longitudinal central axis aligned with the longitudinal central axis of the fluid chamber is retained therein by a fluid tight seal system. The tube is selectively sized to provide a low porosity measurement references preferrably of approximately zero porosity units for a neutron logging instrument disposed therein. Cylindrical neutron moderator rods of preselected diameters are selectively inserted into the annulus outside of the instrument and inside the tube to provide a plurality of fixed and repeatable porosity calibration points that incorporate the major range of measurable formation porosities typically encountered in subsurface formations. Thus, there is provided a method and an apparatus for calibration and verification of neutron logging instruments, which produce selectable and precisely repeatable environments that represent an extensive range of formation porosities.

BRIEF DESCRIPTION OF THE DRAWINGS

The calibration and verification system of the present invention can be understood from a reading of the following detailed specification with reference to the following drawings.

DETAILED DESCRIPTION OF THE PREFERRED EMBODIMENT

Figure 1:
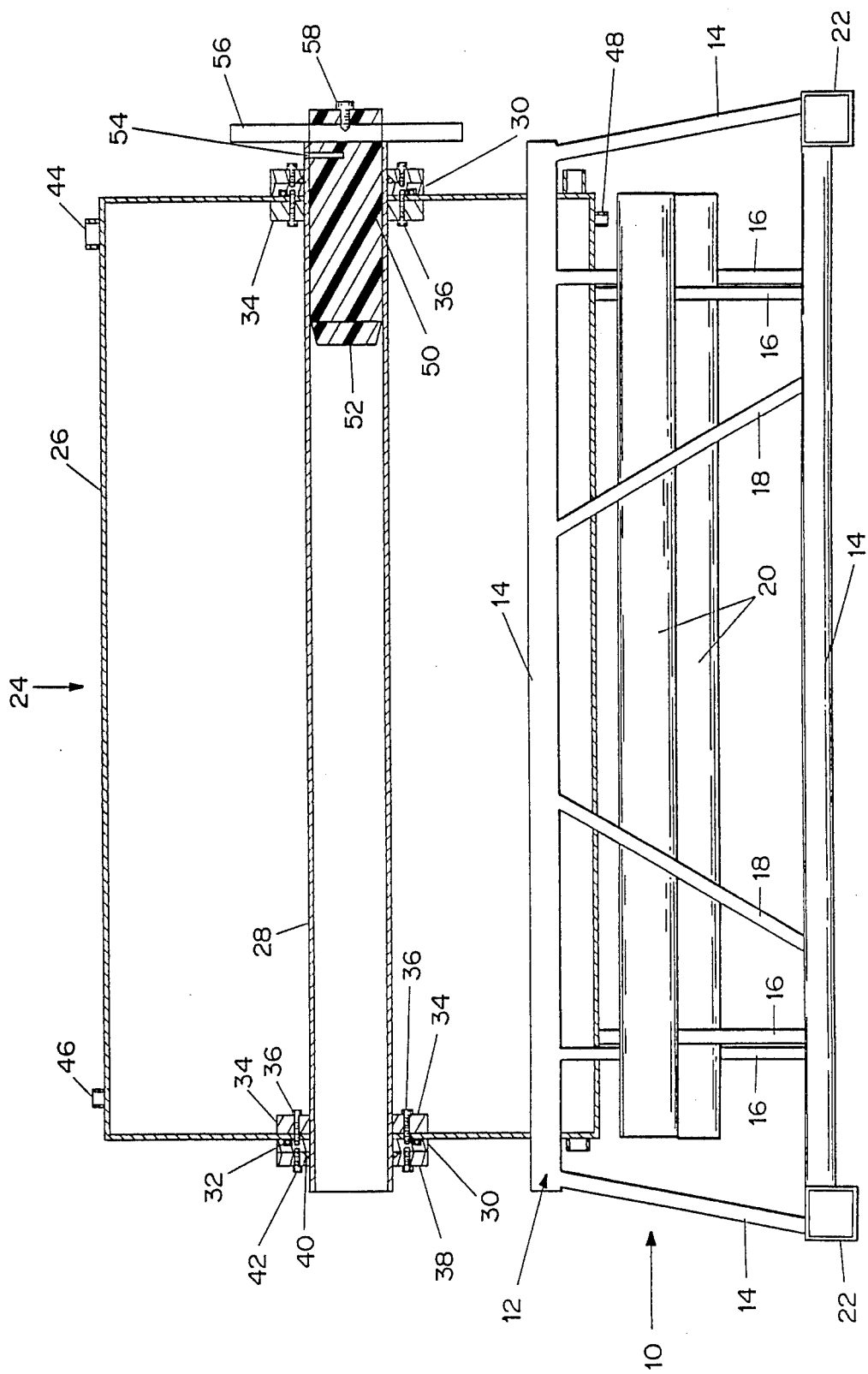
FIG. 1 is an overall representation, partially in longitudinal cross section, of the calibration system of the present invention.
Figure 2:
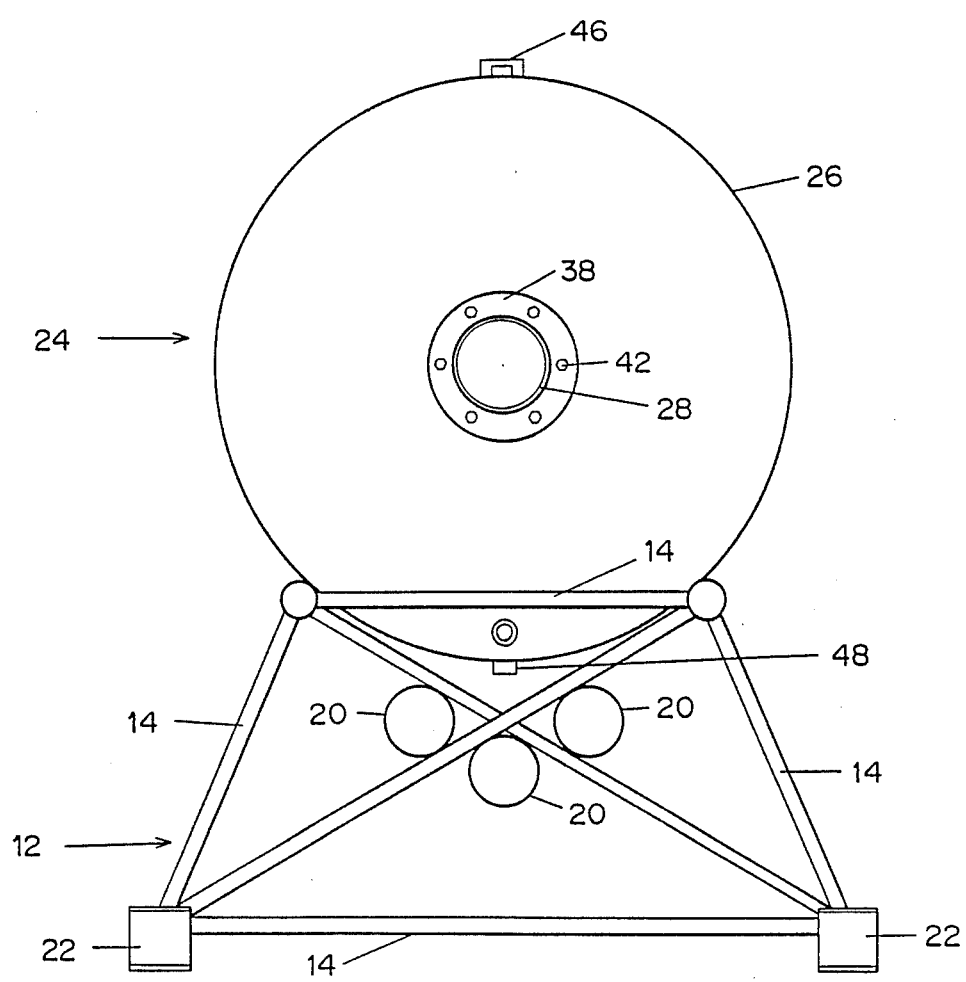
FIG. 2 is an end-view of the calibration system of FIG. 1.

Referring now to the drawings in more detail, and particularly to FIGS. 1 and 2, there is illustrated a neutron logging calibration and verification system in accordance with the present invention. The calibration system includes a support stand 10 having a tubular frame 12. Frame 12 is constructed of a plurality of round stainless steel tubing sections 14 welded together to form generally an isosceles trapezoid quadrangles. Diagonal tubing sections 16 and 18 provide additional strength for frame 12. A plurality of storage tubes 20, constructed of round stainless steel pipe, are a Fixed to tubing sections 16 of frame 12. Footings 22 are welded to the lower corners of frame 12.

Supported by frame 12 is a calibration unit 24. Cylindrical unit 24 includes a fluid chamber 26, which is an elongated tubular tank having a tube 28 mounted horizontally and centrally within chamber 26. Chamber 26 can be constructed of any suitable material, for example stainless steel or polyethylene. Tube 28 can be constructed of any suitable corrosion resistant material with accurately controlled outer and inner dimensions. The inner dimensions of tube 28 is selected to make the calibration unit 24 simulate a low water filled porosity environment of approximately zero porosity units.

Tube 28 is mounted within fluid chamber 26 by a fluid-occlusive seal system utilizing a pair of o-ring seals. It should be recognized that the seal system will be identical at both ends of tube 28. A first ring member 30 having a face groove for returning an o-ring seal 32 provides a fluid-tight face seal with chamber 26. Ring member 30 is mounted to chamber 26 using an inner mounting ring 34 and a plurality of bolts 36 blind threaded into ring member 30. A second outer ring member 38 includes a chamfered face for retaining an o-ring seal 40. Ring member 38 is mounted to ring member 30 by a plurality of bolts 42, with o-ring seal 40 providing a fluid-tight seal between tube 28, ring member 30 and ring member 38.

Fluid chamber 26 is equipped with a filler opening 44, a breather opening 46, and a drain plug 48. Removably installed within one end of tube 28 is an instrument position and radiation shielding member 50 composed of ultra high molecular weight polyethylene and having a generally cylindrical cross-section with a V-shaped groove section 52 provided in the inward face. Position member 50 is retained and oriented in tube 28 by pin 54. Handle 56 allows for easily handling and orientation of position member 50. Handle 56 is attached to position member 50 by suitable means, such as bolt 58.

In order for calibration unit 24 to provide a longitudinally homogeneous and sufficiently massive environment to simulate a uniform formation surrounding a borehole it is filled with an aqueous solution that functions as a neutron moderator and absorber. In the preferred embodiment, fluid chamber 26 contains a solution of approximately 50% water and 50% propylene glycol. This solution reduces the risk of freezing in cold weather locations, providing a useful temperature range from approximately −20° C. to 60° C.

Figure 3:
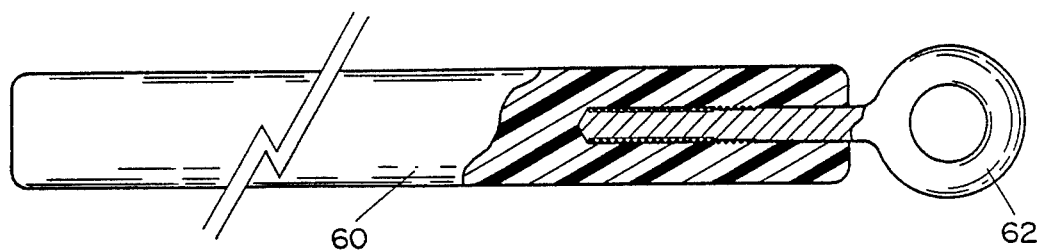
FIG. 3 is a longitudinal, partially cross sectional view of a typical moderator rod.

A requirement of the calibration and verification system of the present invention is to provide selectable and repeatable environments that represent an extensive range of formation porosities. These selectable environments are obtained by using a plurality of moderator rods, an example of which is illustrated in FIG. 3. Each moderator rod 60 is constructed of a suitable hydrogenous material. Material distribution within rod 60 is radially symmetrical and longitudinally homogeneous. In the preferred embodiment, such moderator rod is constructed of a thermoplastic polymer. An example of such material is made from acetal resin and marketed by E. I. DuPont de Nemours and Company under the registered trademark DELRIN. It should be recognized that numerous other materials could be used for moderator rod 60, for example acrylic resin materials or rod 60 could be constructed of hollow tubes filled with a suitable liquid, so long as the desired mechanical, neutron absorbing and neutron moderating properties are obtained.

Each moderator rod 60 has an internally threaded end portion. An eyebolt 62, or other suitable handle, is threaded into each moderating rod 60. When not in use the moderating rods are protectively stored in storage tubes 20.

In the operation of the calibration system of the present invention a neutron instrument is inserted into tube 28. With position member 50 removed from tube 28 the instrument is positioned within tube 28 with the source retaining end extending outside of tube 28. The neutron source is installed, the instrument is repositioned within tube 28 and position member 50 is inserted and pinned in place by pin 54. The instrument can then be abutted with position member 50 to assure the accurate location within tube 28 necessary for repeatable calibrations, and to provide radiation shielding.

Figure 4A:
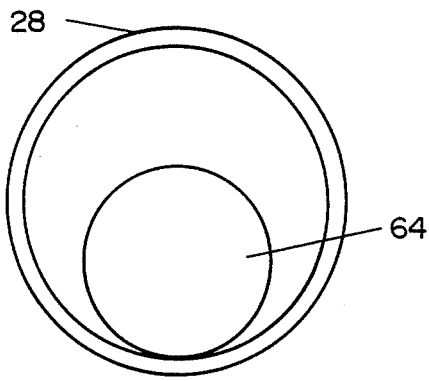
FIG. 4A–4E illustrates various calibration points using various combinations of moderator rods.

A more complete understanding of the operation can be had with reference to FIG. 4A-4E. A neutron logging instrument 64 is shown resting eccentrically within tube 28. As illustrated in FIG. 4A with only instrument 64 positioned within tube 28, a low porosity value, approximately zero porosity units, is obtained. It should be recognized that the precise low porosity value will be dependent on the diameter of instrument 64 and tube 28, and on the particular type of instrument 64.

Figure 4B:
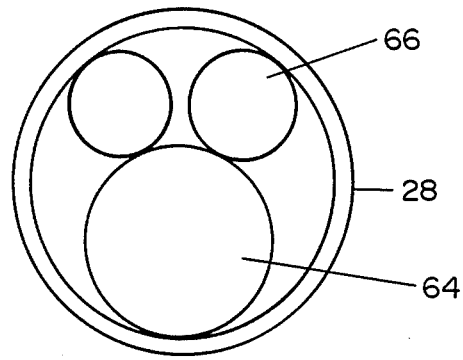
Figure 4C:
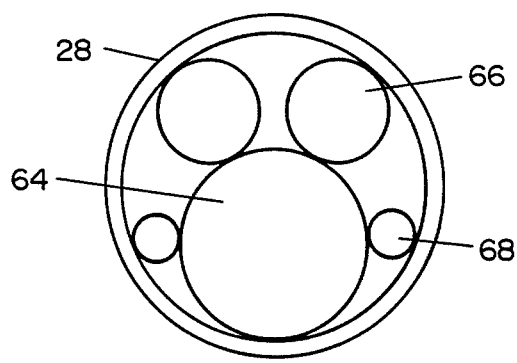
Figure 4D:
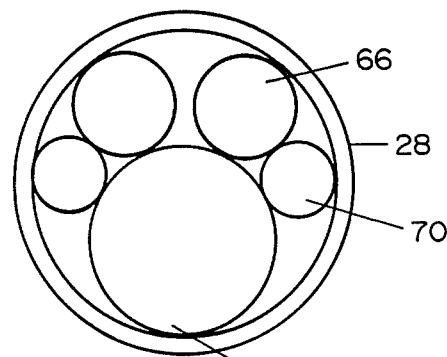
Figure 4E:
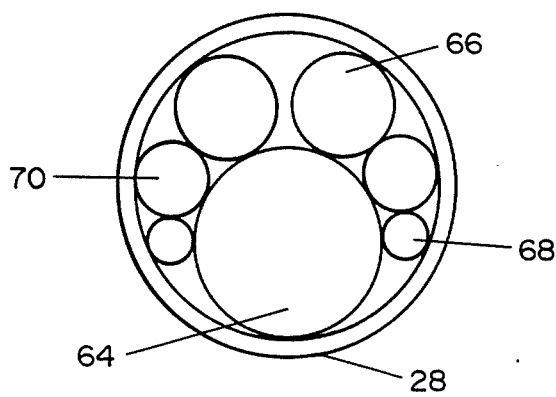

Simulation of greater porosites is achieved by selectively placing combinations of moderator rods 60 into the annular space external to instrument 64 and internal to tube 28. Referring to FIG. 4B there is illustrated the moderator rod configuration to obtain a first porosity unit reference, for example 17 porosity emits, by utilizing a first pair of moderator rods 66 having a first selected diameter. FIG. 4C illustrates the moderator rod configuration to obtain a second porosity unit reference, for example 24 porosity emits, by utilizing two pairs of moderator rods 66 and 68 having first and second selected diameters, respectively. FIG. 4D illustrates the moderator rod configuration to obtain a third porosity unit reference, for example 43 porosity emits, by utilizing two pairs of moderator rods 66 and 70 having first and third selected diameters, respectively. FIG. 4E illustrates the moderator rod configuration to obtain a fourth porosity unit reference, for example 74 porosity emits, by utilizing three pairs of moderator rods 66, 68 and 70 having first, second and third diameters, respectfully.

As previously stated, it should be recognized that the precise porosity unit value obtained will be dependent on the instrument type, on the diameters of instrument 64 and tube 28, and upon the diameters selected for moderator rods 66, 68 and 70. The diameters and numbers of pairs of moderator rods 66, 68 and 70 are selected based on the area available within the annulus and the desired porosity unit calibration points.

Many modifications and variations besides those specifically mentioned may be made in the techniques and structures described herein and depicted in the accompanying drawings without departing substantially from the concept of the present invention. For example, the described system can be used as a quality control standard for qualification of detectors and sources. Likewise, a reference radiation detector can be installed within fluid chamber 26 to provide a measurement of the radiation flux emitted by a source under controlled conditions. Accordingly, it should be understood that the forms of the invention described and illustrated herein are only exemplary, and are not intended as limitations on the scope of the present invention.

What is claimed is:

1. Apparatus for calibrating a well logging instrument, comprising:
   a cylinder containing an aqueous liquid solution having neutron moderating and absorbing properties,
   an elongated tubular member disposed within said cylinder and adapted for receiving the well logging instrument therein, said tubular member having preselected diameters to simulate a first calibration reference value for the well logging instrument, and
   a plurality of rod members selectively insertable into said tubular member with the well logging instrument for selectively simulating a plurality of calibration reference values for said instrument, said rod members having a plurality of preselected diameters to simulate said plurality of calibration values.

2. Apparatus for calibrating the porosity response of a neutron well logging instrument, comprising:
   a cylinder containing a neutron moderating and absorbing solution comprising water and glycol;
   a calibration tube traversing said cylinder and adapted for receiving the neutron well logging instrument therein, said tubular member having preselected internal and external diameters to simulate a first low porosity reference value for the neutron well logging instrument, a plurality of rod members selectively insertable into said calibration tube with the neutron well logging instrument for selectively simulating a plurality of porosity reference values for the instrument.

3. The apparatus of claim 2 wherein said rod members further comprise selectively sized members to produce said selective porosity reference values.

4. The apparatus of claim 3, wherein said rod members are constructed of a hydrogenous material.

5. The apparatus of claim 4, wherein said hydrogenous material further comprises a polymer material.

6. A method for calibrating a neutron well logging instrument, comprising the steps of:

defining a neutron moderating and absorbing environment comprising an aqueous liquid solution, defining a first porosity calibration reference disposed within said neutron moderating and absorbing environment, disposing the neutron well logging instrument within said first porosity calibration reference for simulating a first porosity reference value for the instrument, and selectively altering the porosity calibration reference values for the neutron well logging instrument by disposing hydrogenous material of selected size adjacent the instrument in said defined first porosity calibration reference.

* * * * *